(12) United States Patent
Shin

(10) Patent No.: US 12,675,279 B2
(45) Date of Patent: Jul. 7, 2026

(54) METHOD AND APPARATUS FOR ACTIVELY UPDATING VEHICLE SOFTWARE

(71) Applicants:Hyundai Motor Company, Seoul (KR); Kia Corporation, Seoul (KR)

(72) Inventor: Yong Jin Shin, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 251 days.

(21) Appl. No.: 18/512,763

(22) Filed: Nov. 17, 2023

(65) Prior Publication Data

US 2024/0211240 A1 Jun. 27, 2024

(30) Foreign Application Priority Data

Dec. 27, 2022 (KR) ......................... 10-2022-0186328

(51) Int. Cl.
| | |
|---|---|
| *G06F 8/65* | (2018.01) |
| *G06F 8/658* | (2018.01) |
| *H04W 4/02* | (2018.01) |
| *B60R 16/023* | (2006.01) |

(52) U.S. Cl.
CPC ............ *G06F 8/65* (2013.01); *B60R 16/0231* (2013.01)

(58) Field of Classification Search
CPC . G06F 8/65; G06F 8/71; G06F 9/4484; G06F 9/567; B60R 16/0231; H04L 67/34
See application file for complete search history.

(56) References Cited

U.S. PATENT DOCUMENTS

| | | | | |
|---|---|---|---|---|
| 11,468,215 | B2 * | 10/2022 | Shiraishi | ................. G06F 30/20 |
| 2018/0233821 | A1 * | 8/2018 | Pham | ..................... H01Q 3/267 |
| 2019/0258477 | A1 * | 8/2019 | Teraoka | ................... H04W 4/50 |
| 2020/0172112 | A1 * | 6/2020 | Kawashima | ....... G06Q 30/0278 |
| 2021/0173635 | A1 * | 6/2021 | Shin | ................... G01R 31/3647 |
| 2021/0373880 | A1 * | 12/2021 | Kauppinen | ........... B66B 25/003 |
| 2023/0289171 | A1 * | 9/2023 | Abdelaziz | .............. G06F 21/34 |

* cited by examiner

*Primary Examiner* — S. Sough
*Assistant Examiner* — Mohammad H Kabir
(74) *Attorney, Agent, or Firm* — Banner & Witcoff, Ltd.

(57) ABSTRACT

The present disclosure in some embodiments provides a method and an apparatus for updating software. The present disclosure provides a method of updating software, including providing a user of a vehicle with one or more vehicle software update options, determining whether an update condition is met based on a vehicle software update option, among the one or more vehicle software update options, that is selected by the user, and updating software of the vehicle based on the update condition being met. The vehicle software update options include at least one of a destination-based update or a driving pattern-based update.

20 Claims, 17 Drawing Sheets

| ⤺ | HOME | Status Bar ⌐¬ | |
|---|---|---|---|
| | | General Settings | |
| Update Options | ● Destination-based Update | | After Arriving at the Destination, You Will Receive an Update Notification When Vehicle's Update Conditions Are Met. |
| | ○ Driving Pattern-based Update | | |
| | | | |

FIG. 4A

| ⤺ | HOME | Status Bar ⌐¬ | |
|---|---|---|---|
| | | General Settings | |
| Update Options | ○ Destination-based Update | | Will Learn Driving History and Provide an Update Notification When Vehicle's Update Conditions Are Met. |
| | ● Driving Pattern-based Update | | |
| | | | |

FIG. 4B

| | Category | Mon | Tue | Tue | Wed | Wed | Wed | Wed | Thu | Thu | ... | Fri | Fri |
|---|---|---|---|---|---|---|---|---|---|---|---|---|---|
| eMMC | Driving Start Time | 19:40 | 06:40 | 18:05 | 06:43 | 09:50 | 12:50 | 18:34 | 06:42 | 19:32 | ... | 19:23 | 07:02 |
| | Stop Time | 20:20 | 07:20 | 18:50 | 07:30 | 10:10 | 13:20 | 19:21 | 07:14 | 20:05 | ... | 20:10 | 07:40 |
| | Driving Time | 40Min. | 40Min. | 45Min. | 47Min. | 20Min. | 30Min. | 47Min. | 32Min. | 33Min. | ... | 47Min. | 38Min. |
| | Stop Location (POI/GPS) | RAE MI AN | L-Tower | RAE MI AN | L-Tower | COEX | L-Tower | RAE MI AN | L-Tower | RAE MI AN | ... | RAE MI AN | L-Tower |

*FIG. 6*

| eMMC | Category | 1st | 2nd | 3rd | 4th | 5th | 6th | 7th | 8th | 9th | ... | 19th | 20th |
|---|---|---|---|---|---|---|---|---|---|---|---|---|---|
| | File Size | 452MB | 501MB | 1.4GB | 1.2GB | 484MB | 22MB | 1.3GB | 356MB | 1.4GB | ... | 373MB | 592MB |
| | Update Time | 11Min. | 14Min. | 28Min. | 24Min. | 12Min. | 3Min. | 24Min. | 10Min. | 27Min. | ... | 10Min. | 15Min. |

*FIG. 7*

| Time (Mon) | 0 | 1 | ... | 6 | 7 | 8 | 9 | 10 | 11 | 12 | ... | 17 | 18 | 19 | 20 | 21 | 22 | 23 |
|---|---|---|---|---|---|---|---|---|---|---|---|---|---|---|---|---|---|---|
| No. Of Times Driving Started | 0 | 0 | ... | 30 | 7 | 0 | 1 | 1 | 4 | 1 | ... | 2 | 10 | 27 | 28 | 1 | 0 | 0 |
| No. Of Times Stopped | 0 | 0 | ... | 0 | 37 | 3 | 0 | 2 | 3 | 2 | ... | 0 | 3 | 13 | 42 | 7 | 0 | 0 |
| Driving Time Average | 0 | 0 | ... | 42Min. 45Min. | | 0 | 20Min. 24Min. | | 15Min. 22Min. | | ... | 30Min. 35Min. | | 43Min. 47Min. 23Min. | | | 0 | 0 |
| Stop Location (GPS) | | | | L‑Tower | L‑Tower | L‑Tower | | COEX | COEX | HQ, Yang jae | ... | | Barbe que | RAE MI AN | RAE MI AN | RAE MI AN | | |
| | | | | | | | | Sam sung Stn. | Sam sung Stn. | | | | | | | | | |
| | | | ... | | | | | ... | ... | ... | | | | | | | | |

Monday

*FIG. 9*

| Minutes | No. Of Times Driving Started | No. Of Times Stopped | Stop Location (GPS) | |
|---|---|---|---|---|
| 0 | 1 | | | |
| 1 | | | | |
| 2 | 2 | | | |
| 3 | | | | |
| 4 | 2 | | | |
| 5 | 1 | | | |
| ...10... | ...1... | ⋮ | ⋮ | ⋮ |
| 18 | | 1 | Samsung Stn. | |
| 19 | | | | |
| 20 | | 1 | L-Tower | |
| 21 | | 2 | L-Tower | |
| 22 | | 1 | L-Tower | |
| 23 | | | | |
| 24 | | | | |
| 25 | | | | |
| 26 | | | | |
| 27 | | | | |
| 28 | | 5 | L-Tower | |
| 29 | | 5 | L-Tower | Gangnam Stn. ⋮ |
| 30 | | 6 | L-Tower | Samsung Stn. ⋮ |
| 31 | | 7 | L-Tower | |
| 32 | | 4 | L-Tower | |
| ...38 | ⋮ | 2 | Samsung Stn. | ⋮ |
| 39 | | | | |
| 40 | | | | |
| 41 | | 1 | L-Tower | |
| ...50 | ⋮ | 1 | L-Tower | ⋮ |
| 51 | | | | |
| 52 | | | | |
| 53 | | 1 | Samsung Stn. | |
| ...59 | ⋮ | ⋮ | ⋮ | ⋮ |

*FIG. 10*

| Minutes | 0 | ... | 5 | 6 | 7 | ... | 32 | 33 | 34 | ... | 40 | 41 | 42 | 43 | 44 | 45 | 46 | 47 | 48 | ... | 53 | 54 | 55 | ... | 59 |
|---|---|---|---|---|---|---|---|---|---|---|---|---|---|---|---|---|---|---|---|---|---|---|---|---|---|
| No. Of Times Driving Started | | ⋮ | | 1 | | ⋮ | | | | ⋮ | | 2 | 4 | 3 | 7 | 4 | 2 | 3 | 1 | ⋮ | | | | ⋮ | |
| No. Of Times Stopped | | ⋮ | | | | ⋮ | | 1 | | ⋮ | | | | | | | | | | ⋮ | 4 | 5 | 3 | ⋮ | |
| Stop Location (GPS) | | ⋮ | | | | ⋮ | | D-store | | ⋮ | | | | | | | | | | ⋮ | Seoul Stn. RAEMIAN | Gangnam Stn. RAEMIAN | RAEMIAN | ⋮ | |

*FIG. 11*

| Minutes | 0 | 1 | 2 | 3 | … | 9 | 10 | 11 | 12 | 13 | 14 | 15 | 16 | 17 | 18 | … | 31 | 32 | 33 | 34 | 35 | 36 | 37 | 38 | 39 | 40 | 41 | 42 | 43 | 44 | … | 51 | 52 | 53 | … | 59 |
|---|---|---|---|---|---|---|---|---|---|---|---|---|---|---|---|---|---|---|---|---|---|---|---|---|---|---|---|---|---|---|---|---|---|---|---|---|
| No. Of Times Driving Started |  |  |  | 2 | ⋮ | 3 | 3 | 5 | 1 | 2 | 1 |  |  |  |  | 2 |  |  | 2 |  | 2 |  |  |  |  |  |  |  |  | 4 |  | 1 |  |  |  |  |
| No. Of Times Stopped |  |  |  |  | ⋮ |  |  |  |  |  |  | 3 |  |  | 1 | ⋮ |  |  | 3 | 2 | 1 | 1 | 8 | 3 | 2 | 4 | 2 | 4 | 2 |  | ⋮ | 2 |  | 4 | ⋮ |  |
| Stop Location (GPS) |  |  |  |  | ⋮ |  |  |  |  |  |  | Seoul Stn. |  |  | Yeouido | ⋮ |  |  | RAEMIAN | RAEMIAN | Seoul Stn. | RAEMIAN | RAEMIAN | RAEMIAN / Guro Stn. | RAEMIAN / D-store | RAEMIAN | RAEMIAN | RAEMIAN | Seoul Stn. |  | ⋮ | D-store |  | RAEMIAN | ⋮ |  |

*FIG. 12*

| Day of Week | Update File Size | Time | Location | Estimated Update Time | Possibility of Driving During Update | Update Pop-up Generated |
|---|---|---|---|---|---|---|
| Monday | 753MB | 07:15~07:45 | L-Tower | 18Min. | None | O |
| Monday | 753MB | 19:24~20:19 | RAEMIAN | 18Min. | High | X |
| Monday | 753MB | 20:22~20:52 | RAEMIAN | 18Min. | Low | O |
| Tuesday | ⋮ | ⋮ | ⋮ | ⋮ | ⋮ | ⋮ |

*FIG. 13*

METHOD AND APPARATUS FOR ACTIVELY UPDATING VEHICLE SOFTWARE

CROSS-REFERENCE TO RELATED APPLICATIONS

This application is based on, and claims priority from, Korean Patent Application Number 10-2022-0186328, filed Dec. 27, 2022, the disclosure of which is incorporated by reference herein in its entirety.

TECHNICAL FIELD

The present disclosure relates to a method and an apparatus for actively updating vehicle software. More particularly, the present disclosure relates to a method and an apparatus for actively updating vehicle software while the vehicle is turned off.

BACKGROUND

The statements in this section merely provide background information related to the present disclosure and do not necessarily constitute prior art.

Recent developments in electronics have led to an increasing number of electronic control units (ECUs) being incorporated in vehicles. The software implemented in vehicles has also evolved both in quantity and quality, becoming more complicated. Accordingly, there is a need to periodically update the software applied to the ECU to conduct maintenance such as resolving errors (e.g., bug fixes) and adding new features to follow the changing electronic communication environment and development of technology. For such updates, vehicle manufacturers or ECU developers have conventionally performed ECU updates offline, which can be time consuming and inconvenient because the driver of the vehicle has to move to a location at which the update is possible.

There is an increasing need for immediate (e.g., in-place) updates of various functions of more advanced vehicles such as smart cars, autonomous vehicles, and connected cars that have been commercialized to manifest recent technological developments. This need has led to use of a method of updating the ECU with dedicated update software installed in the information system of the vehicle by using over-the-air (OTA) technology, which is an update method through wireless communications. OTA is a technology that enables updating software in real time with wireless communication technology. A vehicle with OTA capability can be upgraded to incorporate the latest features by adding new functions such as real-time navigation information, sound effects, etc., and by correcting errors, without the need for a reservation with a repair shop (e.g., a dealership), a universal serial bus (USB) connection, or other intermediary stages. OTA is utilized to improve driver assistance functions such as lane departure detection/avoidance, collision avoidance, or autonomous driving functions. Security updates to block hacking attacks may be performed using OTA. When updating vehicle software, the software may need to be updated even when the vehicle is turned off.

SUMMARY

According to at least one embodiment, the present disclosure provides a method including providing, by a computing device, a user of a vehicle with one or more vehicle software update options, wherein the vehicle software update options comprise at least one of a destination-based update or a driving pattern-based update; determining whether an update condition is met based on a vehicle software update option, among the one or more vehicle software update options, that is selected by the user; and updating software of the vehicle based on the update condition being met.

The method may further include determining, based on the vehicle being turned on while the software is being updated, whether the updating of the software corresponds to updating a safety controller; and determining, based on a result of the determining of whether the updating of the software corresponds to updating the safety controller, whether to make the vehicle drivable and whether to proceed with the updating of the safety controller.

Determining of whether the update condition is met may include: determining, based on the vehicle software update option selected by the user being the destination-based update, whether the vehicle has arrived at a destination; and determining, based on the vehicle having arrived at the destination, whether the vehicle is turned off and whether a state of charge (SOC) of the vehicle exceeds a predetermined value, wherein the destination is a location set in at least one of a navigation system or a predetermined unit mounted on the vehicle.

Determining of whether the update condition is met may include: based on the vehicle software update option selected by the user being the driving pattern-based update, determining at least one of: whether the vehicle is turned off, whether a time that the vehicle is expected to remain turned off for is longer than a time required for updating the software, whether the vehicle stops at a predetermined location, or whether the vehicle is not expected to be driven during the updating of the software.

Updating of the software may include: providing the user of the vehicle with an update pop-up dialog box; and updating the software based on that the user agrees to the updating.

The time that the vehicle is expected to remain turned off for and the predetermined location may be determined by a driving pattern model associated with the vehicle.

The driving pattern model may be configured to determine the time that the vehicle is expected to remain turned off for and the predetermined location by using information on a driving pattern of the vehicle stored in a removable storage device.

The information on the driving pattern of the vehicle may include at least one of a driving start time, a stop time, a driving time duration, a stop location, a number of times driving started, or a number of times the vehicle stopped.

The information on the driving pattern of the vehicle may be stored in the removable storage device for each day of a week. The information on the driving pattern of the vehicle may be stored in the removable storage device in at least one of hours or minutes.

According to another embodiment, the present disclosure provides a software update apparatus including at least one processor; and a memory storing instructions that, when executed by the at least one processor, cause the software update apparatus to: provide a user of a vehicle with one or more vehicle software update options, wherein the vehicle software update options comprise at least one of a destination-based update or a driving pattern-based update; determine whether an update condition is met based on the vehicle software update option, among the one or more vehicle software update options, that is selected by the user; and update software of the vehicle based on the update condition being met.

The instructions, when executed by the at least one processor, may further cause the software update apparatus to: determine, based on the vehicle being turned on while the software is being updated, whether the updating of the software corresponds to updating a safety controller, and determine, based on a result of the determining of whether the updating of the software corresponds to updating the safety controller, whether to make the vehicle drivable and whether to proceed with the updating of the safety controller.

The instructions, when executed by the at least one processor, may cause the software update apparatus to determine whether the update condition is met by: determining, based on the vehicle software update option selected by the user being the destination-based update, whether the vehicle has arrived at a destination, and determining, based on the vehicle having arrived at the destination, whether the vehicle is turned off and whether a state of charge (SOC) of the vehicle exceeds a predetermined value. The destination may be a location set in at least one of a navigation system or a predetermined unit mounted on the vehicle.

The instructions, when executed by the at least one processor, may cause the software update apparatus to determine whether the update condition is met by: determining, based on the vehicle software update option selected by the user being the driving pattern-based update, at least one of: whether the vehicle is turned off, whether a time that the vehicle is expected to remain turned off for is longer than a time required for updating the software, whether the vehicle stops at a predetermined location, or whether the vehicle is not expected to be driven during the update of the software.

The instructions, when executed by the at least one processor, may cause the software update apparatus to: provide the user of the vehicle with an update pop-up dialog box, and update the software based on the user agrees to the update.

The time that the vehicle is expected to remain turned off for and the predetermined location may be determined by a driving pattern model associated with the vehicle.

The driving pattern model may be configured to determines the time that the vehicle is expected to remain turned off for and the predetermined location by using information on a driving pattern of the vehicle stored in a removable storage device.

The information on the driving pattern of the vehicle may include at least one of a driving start time, a stop time duration, a driving time, a stop location, a number of times driving started, or a number of times the vehicle stopped.

The information on the driving pattern of the vehicle may be stored in the removable storage device for each day of a week. The information on the driving pattern of the vehicle may be stored in the removable storage device in at least one of hours or minutes.

BRIEF DESCRIPTION OF THE DRAWINGS

FIGS. 4A and 4B are diagrams illustrating update options displayed on an interface.

FIG. 6 is a diagram illustrating data on driving start times, stop times, driving time durations, and stop locations for each day of the week stored in a storage device.

FIG. 7 is a diagram illustrating the sizes of files and update times stored in a storage device.

FIG. 9 is a diagram illustrating data on the number of times driving started, the number of times stopped, the average driving time duration, and the stop locations on a specific day of the week.

FIG. 10 is a diagram illustrating data on the number of times driving started, the number of times the vehicle stopped, and the stop locations at a specific hour.

FIG. 11 is a diagram illustrating data on the number of times driving started, the number of times the vehicle stopped, and the stop locations at a specific hour.

FIG. 12 is a diagram illustrating data on the number of times driving started, the number of times the vehicle stopped, and the stop locations at a specific hour.

FIG. 13 is a diagram of a method of determining whether to generate an update pop-up.

DETAILED DESCRIPTION

Figure 1:
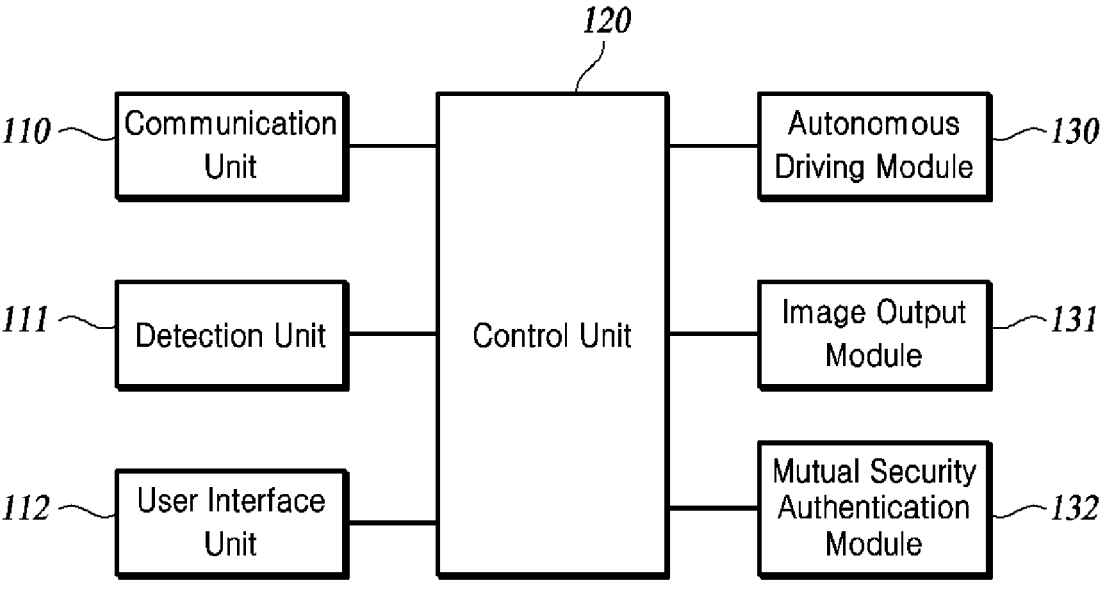
FIG. 1 is a diagram of an onboard vehicle control unit.

Aspects of the present disclosure provide a method and an apparatus for updating vehicle software when the vehicle is turned off.

Another aspect of the present disclosure provides a method and an apparatus for updating vehicle software based on a destination.

Yet another aspect of the present disclosure provides a method and an apparatus for updating vehicle software based on a driving pattern.

Further, yet another aspect of the present disclosure provides a method and an apparatus for providing an update pop-up when the vehicle is turned off.

The objects of the present disclosure are not limited to those particularly described hereinabove, and the above and other objects that the present disclosure could achieve will be clearly understood by those skilled in the art from the following detailed description.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for clarity and for brevity.

Various ordinal numbers or alphanumeric codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, to not exclude thereof unless specifically stated to the contrary.

The description of the present disclosure to be presented below in conjunction with the accompanying drawings is intended to describe example embodiments of the present disclosure and is not intended to represent the only embodiments in which the technical idea of the present disclosure may be practiced.

FIG. 1 is a diagram of an onboard vehicle control unit.

As shown in FIG. 1, each autonomously driving vehicle may include a communication unit (e.g., a communicator) 110, a detection unit (e.g., a detector) 111, a user interface unit (e.g., a user interface) 112, a control unit (e.g., a controller) 120, an autonomous driving module (e.g., an autonomous driver) 130, an image output module (e.g., a display) 131, and a mutual security authentication module (e.g., a mutual security authenticator) 132. The communication unit 110 may transmit and receive information through communication networks between autonomous driving vehicles and between autonomous driving vehicles and other objects. The communication unit 110 may use at least one of the communication schemes including wireless LAN, Wi-Fi, Wi-Fi Direct, Digital Living Network Alliance (DLNA), Wireless Broadband (WiBro), World Interoperability for Microwave Access (WiMax), High Speed Downlink Packet Access (HSDPA), High Speed Uplink Packet Access (HSUPA), Long Term Evolution (LTE), or Long Term Evolution-Advanced (LTE-A) to transmit and receive information through communication networks between the autonomous driving vehicles and between the autonomous driving vehicles and other objects.

Additionally, the communication unit 110 may perform short-range communication between autonomous driving vehicles and between autonomous driving vehicles and other objects. Since autonomous driving vehicles drive while maintaining a short distance from each other, the communication unit 110 may transmit and receive information between autonomous driving vehicles and between autonomous driving vehicles and other objects through short-range wireless communication. In this case, the communication unit 110 may use Bluetooth, Radio Frequency Identification (RFID), Infrared Data Association (IrDA), Ultra WideBand (UWB), ZigBee, Near Field Communication (NFC), Wi-Fi, Wi-Fi Direct, Wireless Universal Serial Bus (USB), or other methods to allow various types of information to be transmitted and received between autonomous driving vehicles and between autonomous driving vehicles and other objects.

The detection unit 111 may include a radar, a camera, and a LIDAR, and the like. The detection unit 111 may detect the speeds and positions of surrounding autonomous driving vehicles and the speeds and positions of nearby objects. The detection unit 111 may detect all objects, including obstacles, people, animals, toll booths, and breakwaters, in addition to autonomous driving vehicles. The user interface unit 112 may provide the driver with a user interface. The user interface unit 112 may receive information from the driver and input the same to the control unit 120 or output a result of the operation performed. For example, the driver may input information of surrounding autonomous driving vehicles and information of surrounding objects into the user interface 112. The user interface unit 112 may input the information on surrounding autonomous vehicles and the information on surrounding objects to the control unit 120. The control unit 120 may issue a control command to the autonomous driving module 130 by using the information on surrounding autonomous vehicles and the information on surrounding objects.

The control unit 120 may control the autonomous driving module 130, the image output module 131, and the mutual security authentication module 132 according to information received from the communication unit 110, the detection unit 111, and the user interface unit 112. The control unit 120 may include a trained learning model. The learning model may correspond to a deep learning-based model. The control unit 120 may further include a training unit (not shown) for pre-training the learning model. The training unit may train the learning model in advance through supervised learning, unsupervised learning, semi-supervised learning, and/or reinforcement learning. A specific method of the training unit training the learning model based on learning data is common in the field, so detailed descriptions thereof will be omitted herein.

The autonomous driving module 130 may change or maintain the speed and direction of the vehicle according to the control command of the control unit 120. The image output module 131 may output images of surrounding vehicles, surrounding obstacles, surrounding buildings, etc. to the driver according to a control command of the control unit 120. The mutual security authentication module 132 may perform authentication using identifiers (IDs) between the surrounding vehicles and between the surrounding objects according to a control command of the control unit 120. This authentication may be performed through UWB. Autonomous driving vehicles can defend against spoofing attacks by attackers through such authentication.

Figure 2:
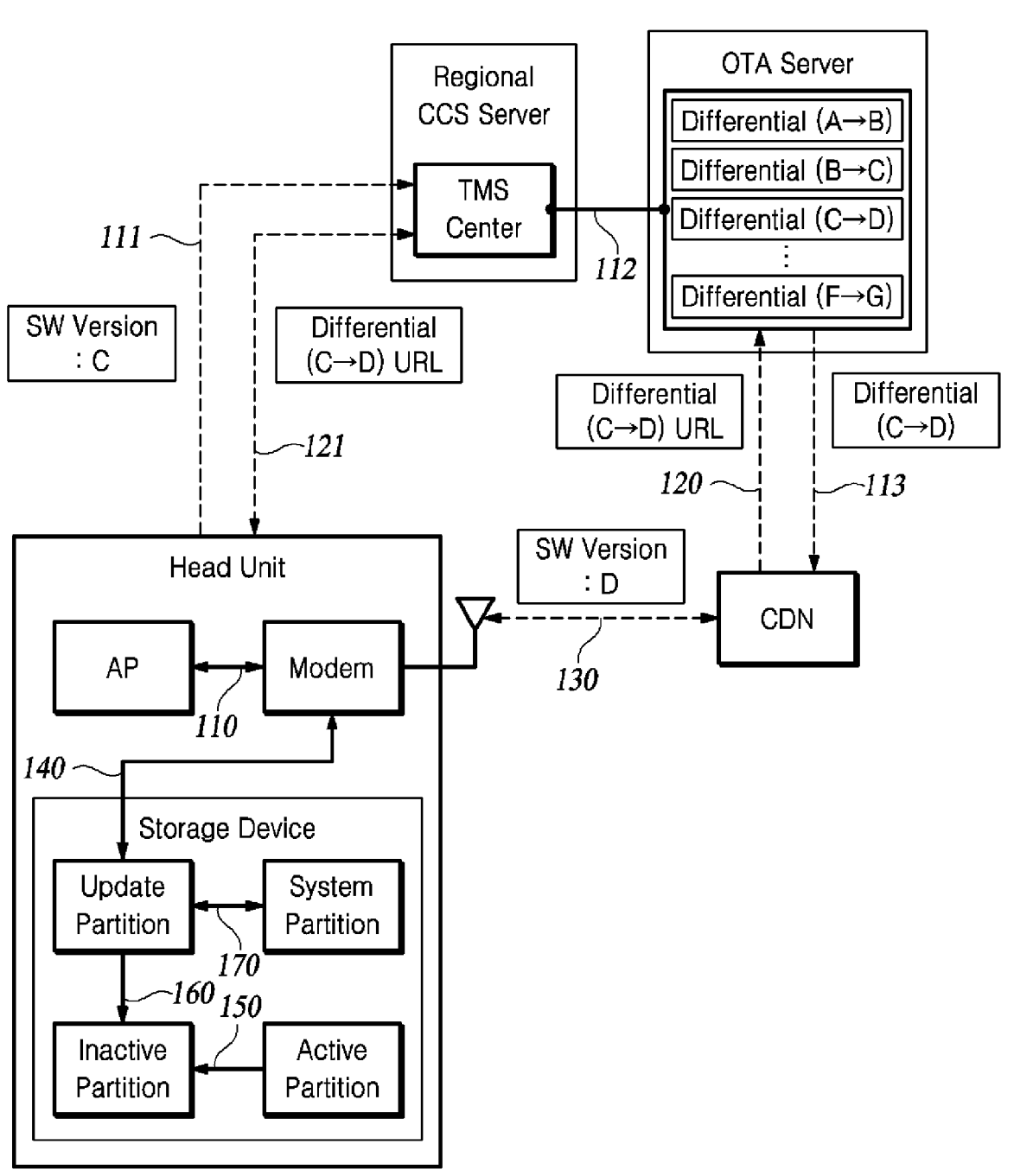
FIG. 2 is a diagram of a vehicle software update system.

FIG. 2 is a diagram of a vehicle software update system.

As shown in FIG. 2, inside a head unit (HU) mounted on a vehicle, an application processor (AP) and a modem may share software-related information between each other (110). When the vehicle has been turned on, the HU may transmit software C to a regional common channel signaling (CCS) server (111). Software C is the software version currently installed in the vehicle. The regional CCS server may transmit software C to an Over-The-Air (OTA) server (112). CCS may correspond to a signaling scheme for operating a communication network by separating signals from traffic. Metadata lists for differential software is stored on the OTA server. The OTA server may use software C to find downloadable differential software. The OTA server may transmit information on the differential software D retrieved with software C to a Content Delivery Network (CDN) (113). The CDN corresponds to a system that stores and provides data on a network with multiple nodes for efficiently delivering content.

The CDN may check whether the differential software D is registered. Upon confirming that the differential software D is registered, the CDN may transmit a Uniform Resource Locator (URL) for the differential software D to the OTA server (120). The OTA server may transmit the URL for the differential software D to the regional CCS. The regional CCS may transmit the URL for the differential software D to the HU (121). The HU may use the URL for the differential software D and the public network to access the CDN to download the differential software D (130). An update partition in a storage device. The storage device may be a removable storage device such as an embedded Multi Media Card (eMMC). The differential software D may be wirelessly downloaded onto the storage device from the modem (140).

After completion of the download of the differential software D, an inactive partition may copy the currently executed software from the active partition (150). The inactive partition may compare the copied software with the differential software D that has been downloaded in the update partition and update the background only for the portions needed (160). After the background is updated, the system partition may compare the software of the system partition with the differential software D downloaded in the update partition and update the foreground only for the portions needed (170).

Figure 3:
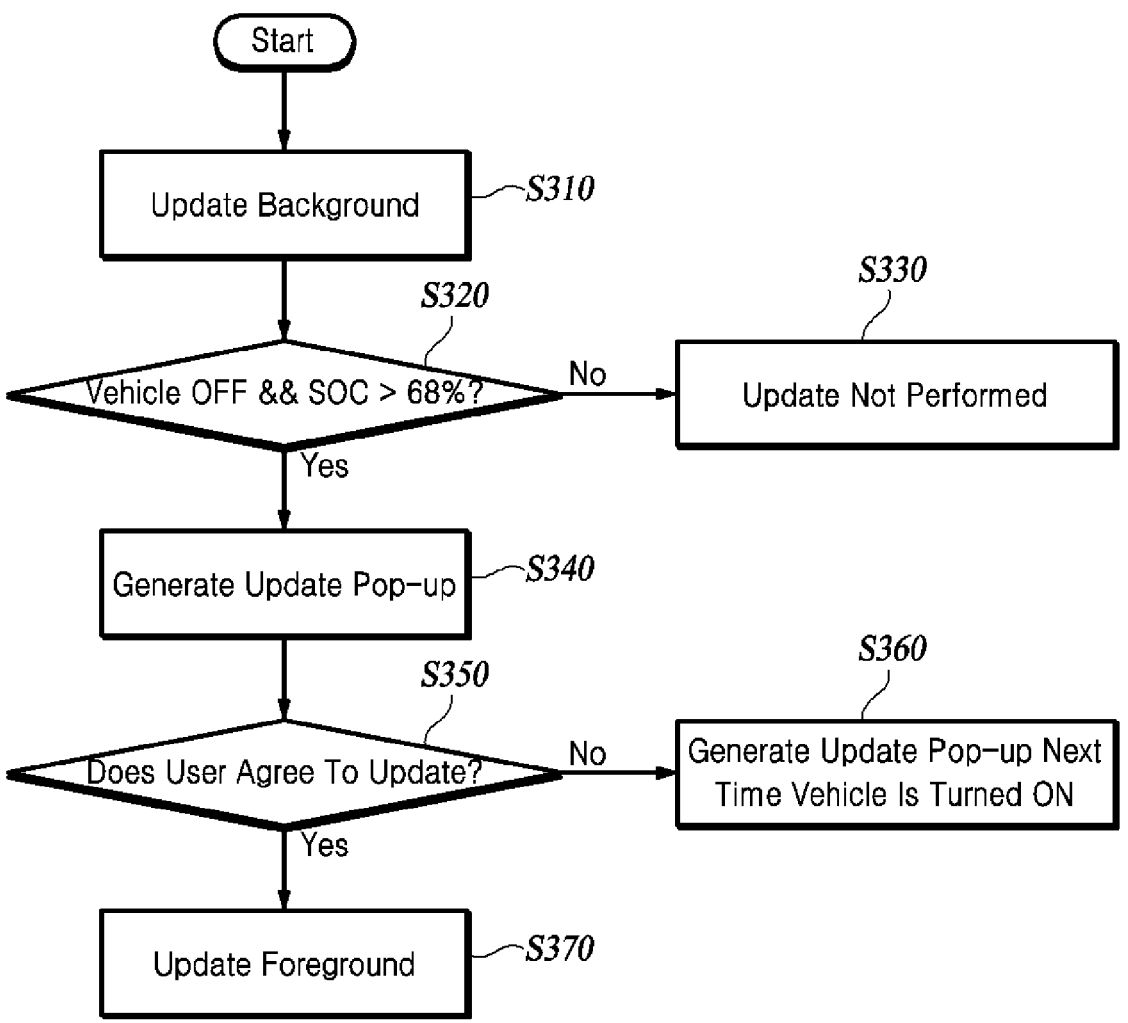
FIG. 3 is a flowchart of the process of updating vehicle software when the vehicle is turned off.

FIG. 3 is a flowchart of the process of updating vehicle software when the vehicle is turned off.

As shown in FIG. 3, the background may be updated (S310). Regarding the background update, the validity of a differential file may be checked. The differential file that has been compressed may be decompressed. An electronic signature may be verified. A delta file may be decrypted. A map database may be backed up. A navigation database may be installed. Maps may be checked. After the background update is completed, whether the vehicle is turned off and whether the State Of Charge (SOC) of the vehicle exceeds 68% may be determined (S320). When the vehicle is turned on or the vehicle's SOC is 68% or less (S320—NO), the foreground update may not proceed (S330). When the vehicle is turned off and the vehicle's SOC exceeds 68% (S320—YES), an update pop-up be generated (S340).

Whether the user agrees to the update pop-up may be determined (S350). When the user does not agree to the update (S350—NO), an update pop-up may be generated the next time the vehicle is turned on (S360). When the user agrees to the update (S350—YES), the foreground may be updated (S370). Installed system files may be checked. When the foreground update is completed, whether or not the update has been completed and an update list may be reported to the user.

For example, when the vehicle is turned on, the vehicle may download new software wirelessly by accessing the OTA server. When an application in the vehicle operates in a dual-partition, a background update may be performed while the vehicle is driving. When an application in the vehicle operates in a single partition, a foreground update may be performed while the vehicle is stopped. After the background update is completed, if the vehicle is turned off, whether the vehicle's SOC exceeds a predetermined value may be determined. If the vehicle's SOC exceeds the predetermined value, an update pop-up may be generated. When the user agrees to the update, the update may proceed. When the user does not agree to the update, the update may not proceed. When the update is completed, the completion may be reported to the user.

FIGS. 4A and 4B are diagrams illustrating update options displayed on an interface. There may be two update options. The first option is a destination-based update and the second option is a driving pattern-based update. The user may decide whether to update the software based on destination or to update the software based on driving pattern. The user may select an update option using the interface.

As shown in FIG. 4A, when the user selects updating the software based on the destination, the interface may display a message to the effect of 'After arriving at the destination, you will receive an update notification if vehicle's update conditions are met'. When the user selects to update the software based on the destination, if the vehicle enters the vicinity of the set destination and the update condition is met, an update agreement pop-up may be generated. Such update conditions may correspond to the vehicle being turned off and the vehicle's SOC exceeding 68%.

As shown in FIG. 4B, when the user selects to update the software based on the driving pattern, the interface may display a message to the effect of "Will learn driving history and provide an update notification when vehicle's update conditions are met." When the user selects to update the software based on the driving pattern, if the vehicle is turned off and stops at a specific time and location based on a result of the learning, an update agreement pop-up may be generated.

The vehicle may continuously store information on the driving start times and stop times in a storage device (e.g., an eMMC). The number of times driving started, the number of times the vehicle stopped and the like may be stored for each day of the week and for each time window on a 24-hour basis. When the number of times driving started and the number of times the vehicle stopped increase in a specific time window, a weight may be added to that time window. Information on weighted stop time in units of minutes may be stored. An average of stop times in units of minutes may be calculated. The average of the stop times in units of minutes may be used as a reference for managing an error range in units of 15 minutes.

The stop locations and the number of times stopped at that stop location may be continuously stored in the storage device (e.g., eMMC). The stop locations and the number of times stopped at that stop location may be stored by using a global positioning system (GPS) and points of interest (POI). When the number of times stopped increases at a specific stop location, such specific stop location may be managed as a user's preferred stop location.

Figure 5:
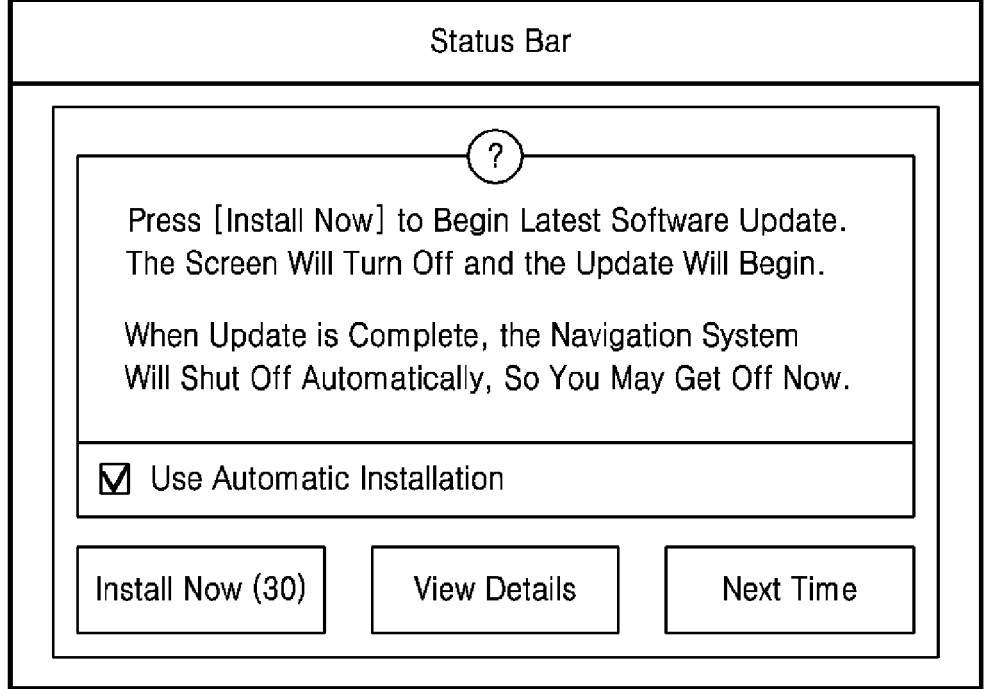
FIG. 5 is a diagram illustrating an update pop-up displayed on an interface.

FIG. 5 is a diagram illustrating an update pop-up displayed on an interface.

As shown in FIG. 5, when the update conditions are met, an update pop-up may be generated. The update pop-up may be displayed on the interface. The interface may display phrases such as "Press [Install Now] to begin latest software update. The screen will turn off and the update will begin" and "When the update is complete, the navigation system will shut off automatically so you may get off now." The user may agree to the update by pressing "Install Now." The user may opt out of the update by pressing "Next time." The user may press "View Details" to see specific details about the update.

FIG. 6 is a diagram illustrating data on driving start times, stop times, driving time durations, and stop locations for each day of the week stored in a storage device.

As shown in FIG. 6, a driving start time, a stop time, a driving time duration, and a stop location may be stored in the storage device (e.g., eMMC) for each day of the week. For example, on Monday, information stored may be the driving start time of 19:40, the stop time of 20:20, the driving time duration of 40 minutes, and the stop location of an apartment building (e.g., RAEMIAN). For example, on Tuesday, information stored may be the driving start time of 6:40, the stop time of 7:20, the driving time duration of 40 minutes, and the stop location of L-Tower. For example, on Wednesday, information stored may be the driving start time of 9:50, the stop time of 10:10, the driving time duration of 20 minutes, and the stop location of COEX. For example, on Thursday, information stored may be the driving start time of 6:42, the stop time of 7:14, the travel time of 32 minutes, and the stop location of L-Tower. For example, on Friday, information may be stored the driving start time of 19:23, the stop time of 20:10, the driving time duration of 47 minutes, and the stop location of RAEMIAN.

FIG. 7 is a diagram illustrating the sizes of files and update times stored in a storage device.

As shown in FIG. 7, update orders, file sizes, and update times may be stored in the storage device (e.g., eMMC). Here, update time refers to the estimated time required for updating. For example, information indicating that the file size is 452 MB and that the update time is 11 minutes may be stored in the first update. For example, information indicating that the file size is 1.4 GB and that the update time is 28 minutes may be stored in the third update. For example, information indicating that the file size is 356 MB and that the update time is 10 minutes may be stored in the 8th update. The update orders may be stored up to the 20th order.

Figure 8:
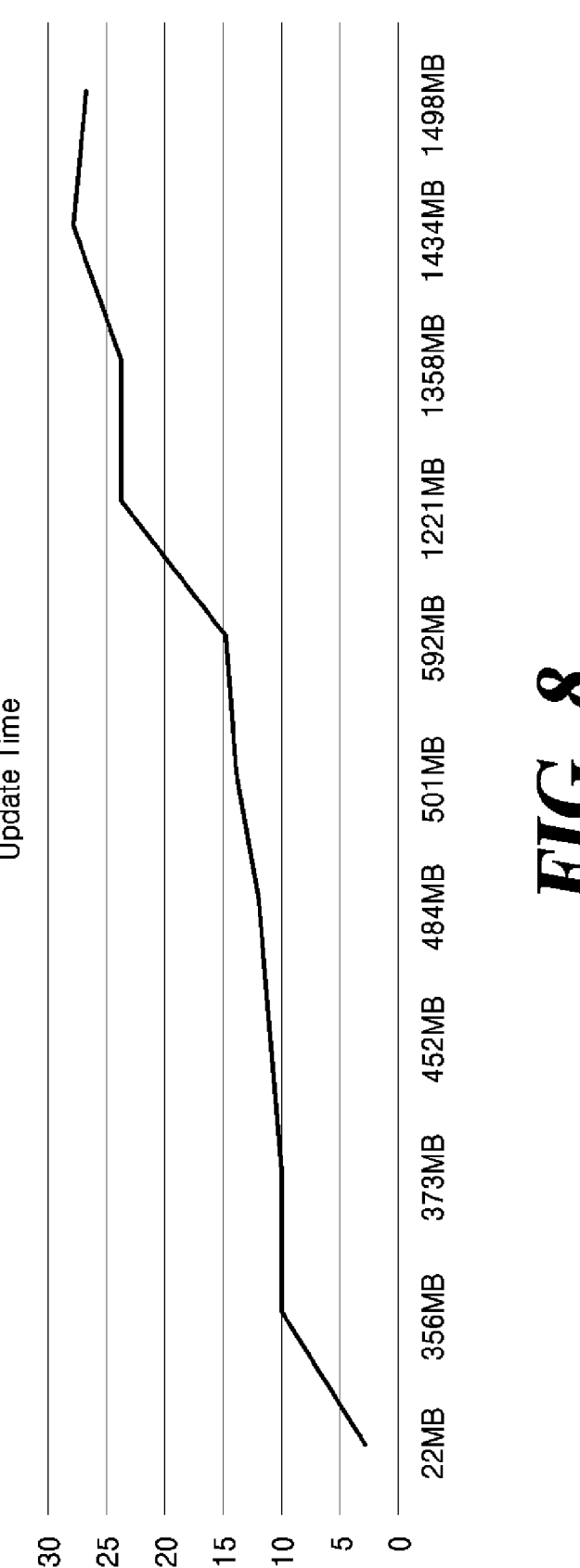
FIG. 8 is a diagram illustrating a relationship between file sizes and update times.

FIG. 8 is a diagram illustrating a relationship between file sizes and update times.

As shown in FIG. 8, a relationship between file size and an update time may be expressed. The unit of file size is MB, and the unit of update time is minutes. The larger the file size, the longer the expected time to update may be.

FIG. 9 is a diagram illustrating data on the number of times driving started, the number of times the vehicle stopped, the average driving time duration, and the stop locations on a specific day of the week.

As shown in FIG. 9, information on the number of times driving started, the number of times the vehicle stopped, the average driving time duration, and the location of the stop may be stored for each time window on Monday. For example, at 7:00 on Monday, information stored may be the number of times driving started of 7, the number of times the vehicle stopped of 37, the average driving time duration of 45 minutes, and the stop location of L-Tower. For example, at 19:00 on Monday, information stored may be the number of times driving started of 27, the number of times the vehicle stopped of 13, the average driving time duration of 43 minutes, and the stop location of RAEMIAN. For example, at 20:00 on Monday, information stored may be the number of times driving started of 28, the number of times the vehicle stopped of 42, the average driving time duration of 47 minutes, and the stop location of RAEMIAN.

FIG. 10 is a diagram illustrating data on the number of times driving started, the number of times the vehicle stopped, and the stop locations at a specific hour.

As shown in FIG. 10, the number of times driving started, the number of times the vehicle stopped, and the stop location at 7:00 on Monday in FIG. 9 may be stored in units of minutes. For example, the number of times driving started at 7:02 may be stored as twice. For example, the number of times driving started at 7:05 may be stored as once. For example, at 7:18, the number of times the vehicle stopped may be stored as once, and the stop location as Samsung Station. For example, at 7:22, the number of times the vehicle stopped may be stored as twice, and the stop location as L-Tower. For example, at 7:29, the number of times the vehicle stopped may be stored as 5 times, and the stop locations as L-Tower and Gangnam Station. For example, at 7:30, the number of times the vehicle stopped may be stored as 6 times, and the stop locations as L-Tower and Samsung Station.

FIG. 11 is a diagram illustrating data on the number of times driving started, the number of times the vehicle stopped, and the stop locations at a specific hour.

As shown in FIG. 11, the number of times driving started, the number of times the vehicle stopped, and the stop locations at 19:00 on Monday in FIG. 9 may be stored in units of minutes. For example, at 19:06, the number of times driving started may be stored as once. For example, at 19:44, the number of times driving started may be stored as 7 times. For example, at 19:33, the number of times the vehicle stopped may be stored as once, and the stop location as D-store. For example, at 19:53, the number of times the vehicle stopped may be stored as 4 times, and the stop locations as RAEMIAN and Seoul Station. For example, at 19:54, the number of times the vehicle stopped may be stored as 5 times, and the stop locations as RAEMIAN and Gangnam Station. For example, at 19:55, the number of times the vehicle stopped may be stored as 3 times, and the stop location as RAEMIAN.

FIG. 12 is a diagram illustrating data on the number of times driving started, the number of times the vehicle stopped, and the stop locations at a specific hour.

As shown in FIG. 12, the number of times driving started, the number of times the vehicle stopped, and the stop locations at 20:00 on Monday in FIG. 9 may be stored in units of minutes. For example, at 20:03, the number of times driving started may be stored as twice. For example, at 20:11, the number of times driving started may be stored as 5 times. For example, at 20:33, the number of times driving started may be stored as twice. For example, at 20:33, the number of times the vehicle stopped may be stored as 3 times, and the stop location as RAEMIAN. For example, at 20:37, the number of times the vehicle stopped may be stored as 8 times, and the stop location as RAEMIAN. For example, at 20:39, the number of times the vehicle stopped may be stored as twice, and the stop locations as RAEMIAN and D-store.

FIG. 13 is a diagram of a method of determining whether to generate an update pop-up. Whether to generate an update pop-up may be determined by using the stored number of times driving started, number of times the vehicle stopped, and stop locations described in FIGS. 9 to 12. Whether to generate an update pop-up (e.g., a dialog box) may be determined by using an update file size, an update time window, an estimated update time, and possibility of driving during the update.

As shown in FIG. 13, the pop-up may be generated when the update file size is 735 MB, the time is between 7:15 and 7:45 on Monday, the location is L-Tower, the estimated update time is 18 minutes, and there is no possibility of driving during the update. The pop-up may not be generated when the update file size is 735 MB, the time is between 19:24 and 20:19 on Monday, the location is RAEMIAN, the estimated update time is 18 minutes, and the possibility of driving during the update is high. The update pop-up may be generated when the update file size is 735 MB, the time is between 20:22 and 20:52 on Monday, the location is RAE-MIAN, the estimated update time is 18 minutes, and the possibility of driving during the update is low.

Figure 14:
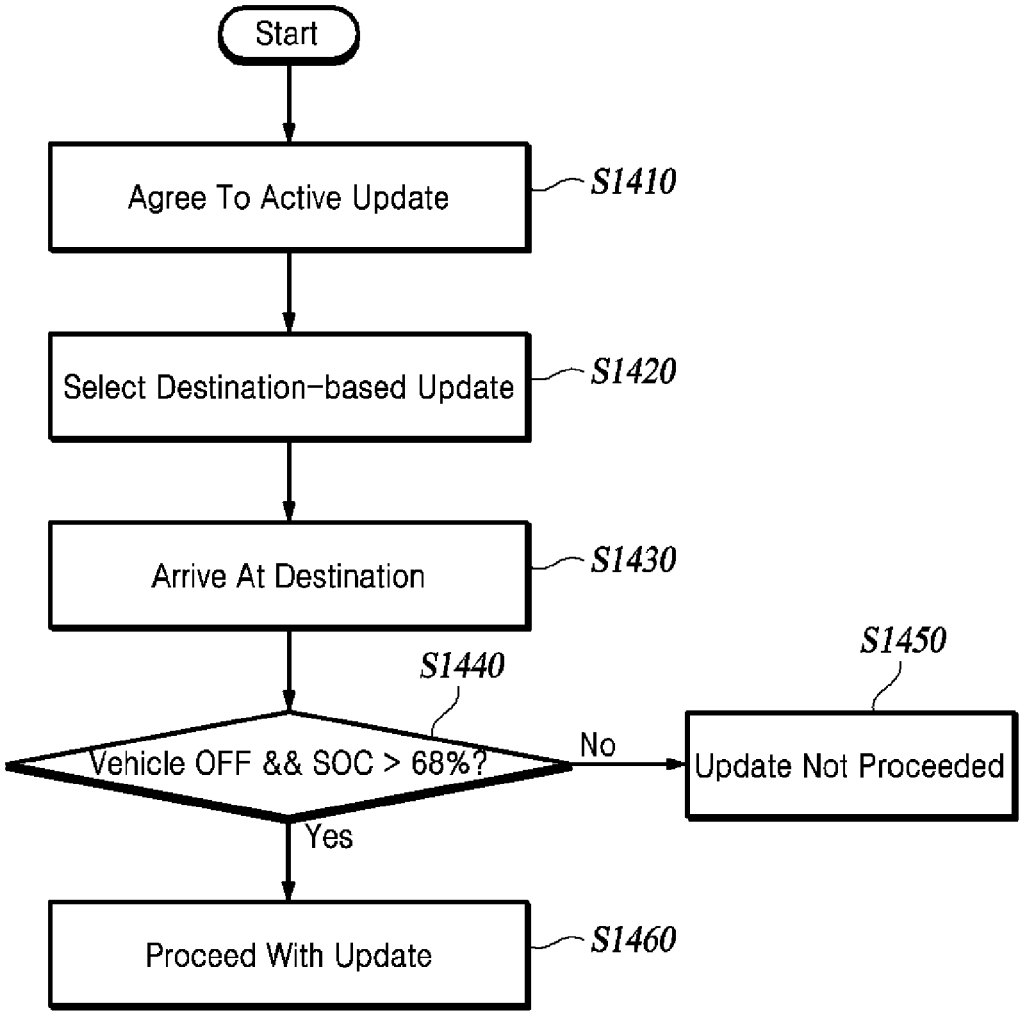
FIG. 14 is a flowchart of the process of updating vehicle software when a destination-based software update is selected.

FIG. 14 is a flowchart of the process of updating vehicle software when a destination-based software update is selected.

As shown in FIG. 14, the user may agree to an active vehicle software update (S1410). The user may select destination-based vehicle software update (S1420). The vehicle may arrive at the destination (S1430). The destination may be home, work, etc. The destination may be a location set in the HU in the vehicle. The destination may be a location set in the navigation system. Whether the vehicle is turned off and whether the vehicle's SOC exceeds 68% may be determined (S1440). When the vehicle is turned on or the vehicle's SOC does not exceed 68% (S1440—NO), vehicle software updates may not proceed (S1450). When the vehicle is turned off and the vehicle's SOC exceeds 68% (S1440—YES), vehicle software updates may proceed (S1460). An update pop-up may be generated before the vehicle software update proceeds. The user may agree to the update.

Figure 15:
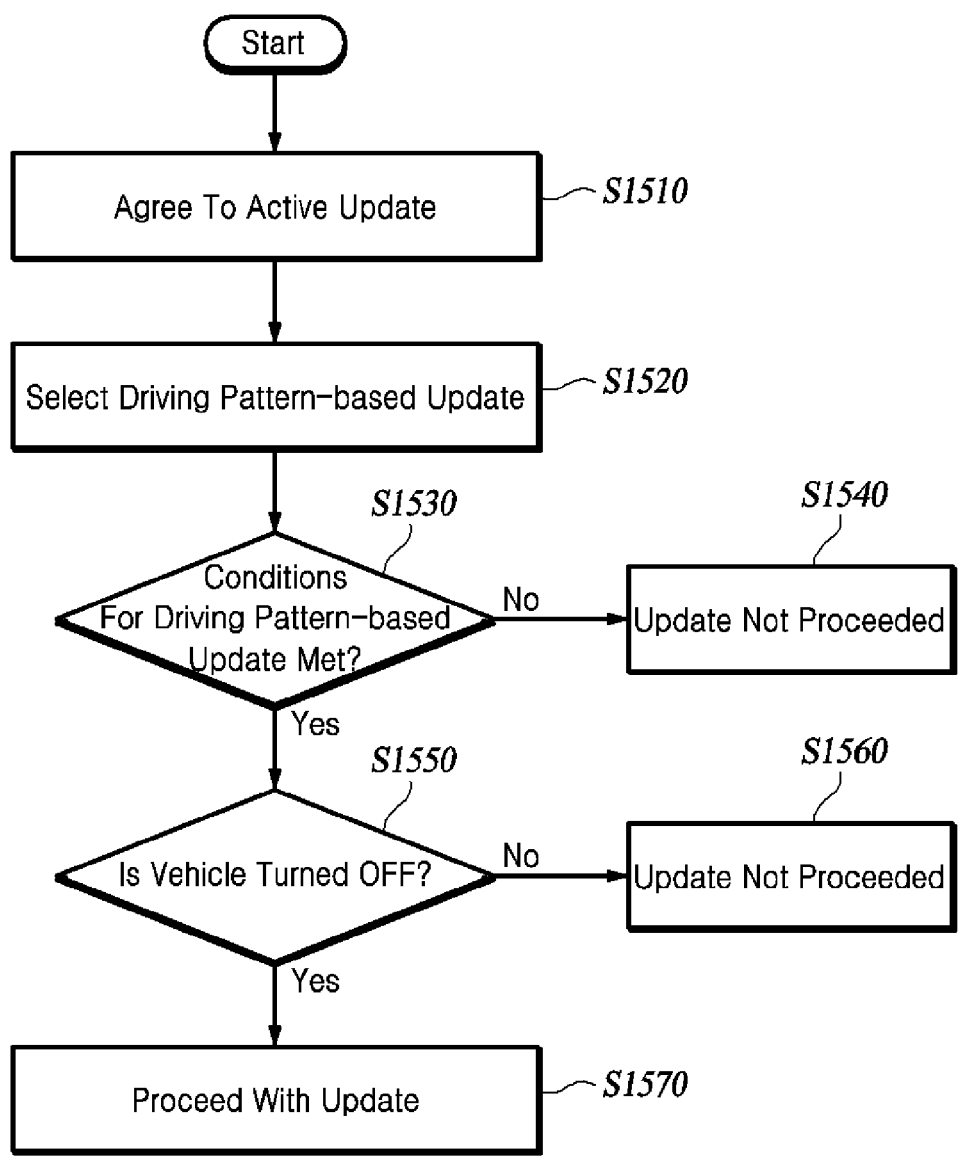
FIG. 15 is a flowchart of a process of updating vehicle software when a driving pattern-based software update is selected.

FIG. 15 is a flowchart of the process of updating vehicle software when a driving pattern-based software update is selected.

As shown in FIG. 15, the user may agree to an active vehicle software update (S1510). The user may select a driving pattern-based software update (S1520). Whether driving pattern-based software conditions are met may be determined (S1530). An Audio Video Navigation Telematics (AVNT) driving pattern model may be a learning model. The AVNT driving pattern model may collect data on driving start times, stop times, driving time durations, stop locations, the number of times driving started in a specific time window, and the number of times the vehicle stopped in a specific time window. The AVNT driving pattern model may analyze the collected data and predict the driving pattern of the vehicle. The AVNT driving pattern model may predict the estimated update time according to the update file size. The AVNT driving pattern model may determine whether to generate an update pop-up by taking into account the update file size, driving pattern, and estimated update time.

The driving pattern-based update conditions are that the AVNT driving pattern model is available to use, the time that the vehicle has been off is greater than the update time, the vehicle stops at the set stop location, and there is no possibility of driving during the update. When the driving pattern-based update conditions are not met (S1530—NO), the vehicle software update may not proceed (S1540). When the driving pattern-based update conditions are met (S1530—YES), Whether the vehicle is turned off may be determined (S1550). When the vehicle is not turned off (S1550—NO), a vehicle software update may not proceed (S1560). When the vehicle is turned off (S1550—YES), a vehicle software update may proceed (S1570). An update pop-up may be generated before the vehicle software update proceeds. The user may agree to the update.

Figure 16:
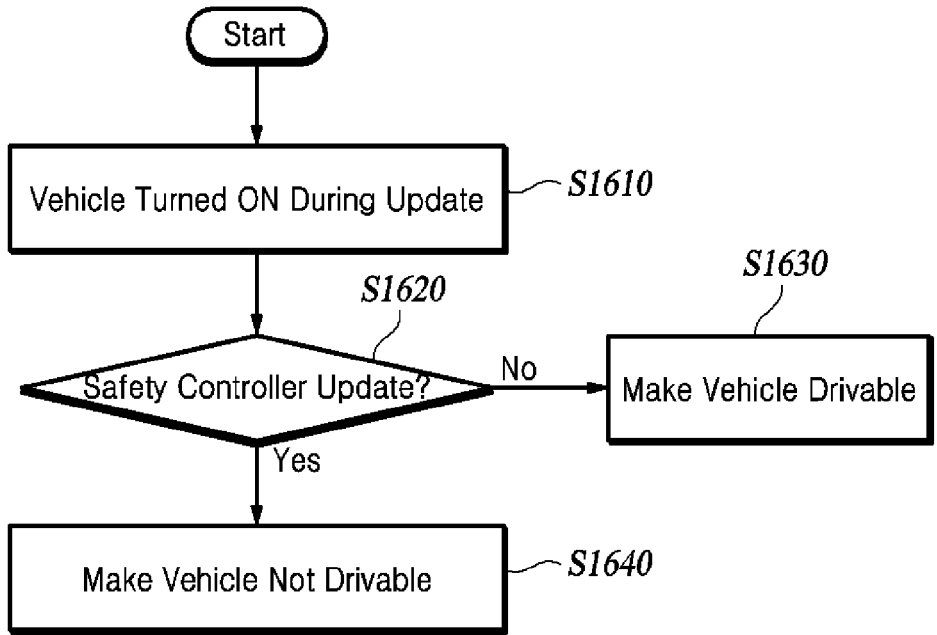
FIG. 16 is a flowchart of the process of a vehicle driving when the vehicle is turned on while updating vehicle software.

FIG. 16 is a flowchart of the process of a vehicle driving when the vehicle is turned on while updating vehicle software.

As shown in FIG. 16, the vehicle may be turned on while updating the vehicle software (S1610). Whether this update corresponds to an update of a safety controller may be determined (S1620). When this update is not an update for the safety controller (S1620—NO), the vehicle may start driving (S1630). The vehicle may remain on. After the vehicle starts driving, the update may continue. When this update is an update for the safety controller (S1620—YES), the vehicle may not be able to drive (S1640). The vehicle may be turned off, and the user may be provided with a notification that the vehicle is undrivable. With the vehicle in a turned off state, the update of the safety controller may continue.

Figure 17:
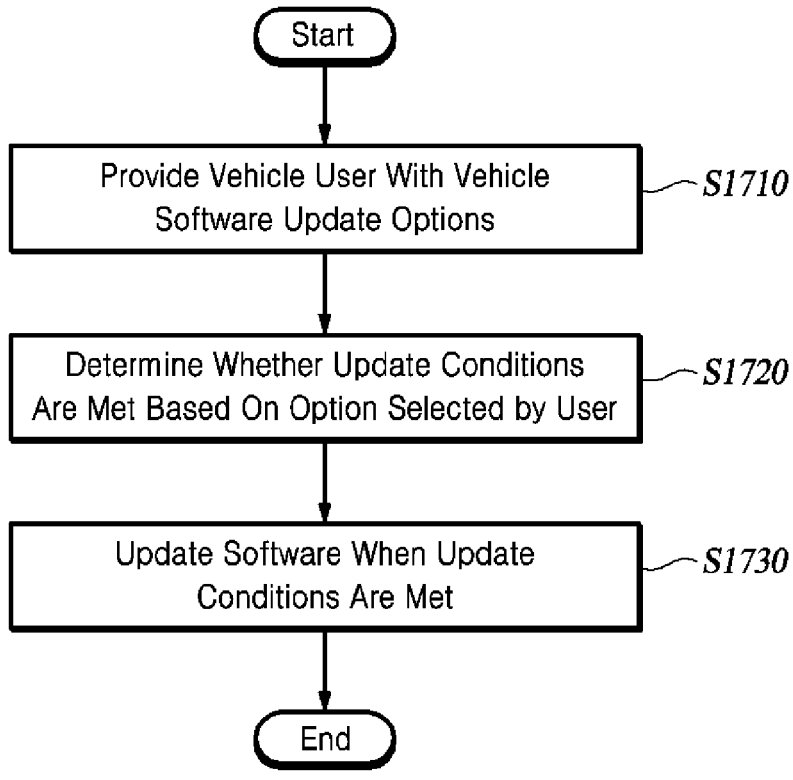
FIG. 17 is a flowchart of a method of updating vehicle software.

FIG. 17 is a flowchart of a method of updating vehicle software.

As shown in FIG. 17, a software update apparatus may provide the vehicle user with vehicle software update options (S1710). The software update apparatus may determine whether the update conditions are met based on the option selected by the user (S1720). The software update apparatus may update the software when the update conditions are met (S1730). The vehicle software update options may include at least one of a destination-based update or a driving pattern-based update. When the vehicle is turned on while updating the software, the software update apparatus may determine whether the software update corresponds to updating the safety controller. Based on the determination result, the software update apparatus may determine whether or not to make the vehicle drivable and whether to proceed with updating the safety controller.

The step of determining whether the update conditions are met may include, when the vehicle software update option selected by the user is the destination-based update, a step of determining whether the vehicle has arrived at the destination, and when the vehicle has arrived at the destination, a step of determining whether the vehicle is turned off and whether the SOC of the vehicle exceeds a predetermined value. The destination may correspond to a location set in at least one of a navigation system or a predetermined unit mounted on the vehicle. The step of determining whether the update condition is met may include, when the vehicle software update option selected by the user is the driving pattern-based update, determining whether the vehicle is turned off and is expected (e.g., based on the driving pattern) to remain turned off for longer than the time for updating the software, whether the vehicle stops at a location corresponding to a set location, and whether the vehicle is not expected (e.g., based on the driving pattern) to be driven during the updating of the software.

The driving pattern model may determine the time the vehicle remains turned off for and the location at which the vehicle stops. The driving pattern model may utilize information on the driving pattern of the vehicle stored in a storage device (e.g., eMMC) to determine the time that the vehicle remains turned off for and the location at which the vehicle stops. The information on the driving pattern of the vehicle may include at least one of a driving start time, a stop time, a driving time duration, a stop location, the number of times driving started, or the number of times the vehicle stopped. The information on the driving pattern of the vehicle may be stored in the storage device (e.g., eMMC) for each day of the week, and the information on the driving pattern of the vehicle may be stored in the storage device (e.g., eMMC) in at least one of hours or minutes. The step of updating the software may include providing the user of the vehicle with an update pop-up (e.g., a dialog box) and, when the user of the vehicle agrees to the update, updating the software.

The apparatus or method according to the present disclosure may arrange the respective components to be implemented as hardware or software, or a combination of hardware and software. Additionally, each component may be functionally implemented by software, and a microprocessor may execute the function by software for each component when implemented.

Various implementations of the systems, techniques, and the like described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or codes, contain instructions for a programmable processor and are stored in a "computer-readable recording medium."

The computer-readable recording medium includes any type of recording device on which data that can be read by a computer system are recordable. Examples of computer-readable recording mediums include non-volatile or non-transitory media such as a read-only memory (ROM), compact disc read-only memory (CD-ROM), magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Although the steps in the respective flowcharts/timing charts are described in this specification as being sequentially performed, they merely instantiate the technical idea of some embodiments of the present disclosure. Therefore, a person having ordinary skill in the pertinent art could perform the steps by changing the sequences described in the respective flowcharts/timing charts or by performing two or more of the steps in parallel, and hence the steps in the respective flowcharts/timing charts are not limited to the illustrated chronological sequences.

According to the present disclosure, a method and an apparatus can be provided for updating vehicle software when the vehicle is turned off.

Additionally, according to the present disclosure, a method and an apparatus can be provided for updating vehicle software based on a destination.

Additionally, according to the present disclosure, a method and an apparatus can be provided for updating vehicle software based on a driving pattern.

Further, according to the present disclosure, a method and an apparatus can be provided for providing an update pop-up (e.g., a dialog box) when the vehicle is turned off.

The effects of the present disclosure are not limited to those mentioned above, and other unmentioned effects will be clearly understood by those skilled in the art from the above description.

Although example embodiments of the present disclosure have been described for illustrative purposes, those skilled in the art will appreciate that various modifications, additions, and substitutions are possible, without departing from the idea and scope of the claimed invention. Therefore, example embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method performed by an apparatus of a vehicle, the method comprising:
   outputting, via a user interface of the vehicle, one or more vehicle software update options, wherein the one or more vehicle software update options comprise at least one of a destination-based update or a driving pattern-based update;
   determining, by a control circuit of the apparatus, whether an update condition is met based on a vehicle software update option, among the one or more vehicle software update options, that is selected via the user interface;
   updating software of the vehicle based on the update condition being met;
   determining, based on the vehicle being turned on while the software is being updated, whether the updating of the software corresponds to updating a safety controller of the vehicle; and
   controlling, by the control circuit and based on determining that the updating of the software corresponds to the updating of the safety controller, the vehicle to be undrivable during the updating of the safety controller.

2. The method of claim 1, wherein the controlling of the vehicle to be undrivable comprises:
   controlling, by the control circuit, the vehicle to turn off; and
   outputting, via the user interface, a notification indicating that the vehicle is undrivable.

3. The method of claim 1, wherein the determining of whether the update condition is met comprises:
   determining, based on the selected vehicle software update option being the destination-based update, whether the vehicle has arrived at a destination; and
   determining, based on the vehicle having arrived at the destination, whether the vehicle is turned off and whether a state of charge (SOC) of the vehicle exceeds a predetermined value, wherein the destination is a location set in at least one of a navigation system or a predetermined unit mounted on the vehicle.

4. The method of claim 1, wherein the determining of whether the update condition is met comprises:
   based on the selected vehicle software update option being the driving pattern-based update, determining at least one of:
   whether the vehicle is turned off,
   whether a time that the vehicle is expected to remain turned off for is longer than a time required for updating the software,
   whether the vehicle stops at a predetermined location, or
   whether the vehicle is not expected to be driven during the updating of the software.

5. The method of claim 4, wherein the time that the vehicle is expected to remain turned off for and the predetermined location are determined by a driving pattern model associated with the vehicle.

6. The method of claim 5, wherein the driving pattern model is configured to determine the time that the vehicle is expected to remain turned off for and the predetermined location by using information on a driving pattern of the vehicle stored in a removable storage device.

7. The method of claim 6, wherein the information on the driving pattern of the vehicle includes at least one of a driving start time, a stop time, a driving time duration, a stop location, a number of times driving started, or a number of times the vehicle stopped.

8. The method of claim 6, wherein the information on the driving pattern of the vehicle is stored in the removable storage device for each day of a week, and
   wherein the information on the driving pattern of the vehicle is stored in the removable storage device in at least one of hours or minutes.

9. The method of claim 1, wherein the updating of the software comprises:
   outputting, via the user interface, an update pop-up dialog box; and
   updating the software based on an update instruction signal that is received via the user interface and indicating the updating.

10. The method of claim 1, further comprising:
   based on the updating of the safety controller being complete, controlling the vehicle to change a state of the vehicle to a drivable state; and
   during autonomous driving of the vehicle in the drivable state, performing a background update of vehicle software that is not associated with the safety controller.

11. An apparatus of a vehicle, the apparatus comprising:
   at least one processor; and a memory storing instructions that, when executed by the at least one processor, cause the apparatus to:

output, via a user interface of the vehicle, one or more vehicle software update options, wherein the one or more vehicle software update options comprise at least one of a destination-based update or a driving pattern-based update;

determine whether an update condition is met based on a vehicle software update option, among the one or more vehicle software update options, that is selected via the user interface;

update software of the vehicle based on the update condition being met;

determine, based on the vehicle being turned on while the software is being updated, whether the updating of the software corresponds to updating a safety controller of the vehicle; and control, based on determining that the updating of the software corresponds to the updating of the safety controller, the vehicle to be undrivable during the updating of the safety controller.

12. The apparatus of claim 11, wherein the instructions, when executed by the at least one processor, cause the apparatus to control the vehicle to be undrivable by:

controlling the vehicle to turn off; and outputting, via the user interface, a notification indicating that the vehicle is undrivable.

13. The apparatus of claim 11, wherein the instructions, when executed by the at least one processor, cause the apparatus to determine whether the update condition is met by:

determining, based on the selected vehicle software update option being the destination-based update, whether the vehicle has arrived at a destination, and determining, based on the vehicle having arrived at the destination, whether the vehicle is turned off and whether a state of charge (SOC) of the vehicle exceeds a predetermined value, wherein the destination is a location set in at least one of a navigation system or a predetermined unit mounted on the vehicle.

14. The apparatus of claim 11, wherein the instructions, when executed by the at least one processor, cause the apparatus to determine whether the update condition is met by:

determining, based on the selected vehicle software update option being the driving pattern-based update, at least one of:

whether the vehicle is turned off, whether a time that the vehicle is expected to remain turned off for is longer than a time required for updating the software, whether the vehicle stops at a predetermined location, or whether the vehicle is not expected to be driven during the update of the software.

15. The apparatus of claim 14, wherein the time that the vehicle is expected to remain turned off for and the predetermined location are determined by a driving pattern model associated with the vehicle.

16. The apparatus of claim 15, wherein the driving pattern model is configured to determine the time that the vehicle is expected to remain turned off for and the predetermined location by using information on a driving pattern of the vehicle stored in a removable storage device.

17. The apparatus of claim 16, wherein the information on the driving pattern of the vehicle includes at least one of a driving start time, a stop time, a driving time duration, a stop location, a number of times driving started, or a number of times the vehicle stopped.

18. The apparatus of claim 16, wherein the information on the driving pattern of the vehicle is stored in the removable storage device for each day of a week, and wherein the information on the driving pattern of the vehicle is stored in the removable storage device in at least one of hours or minutes.

19. The apparatus of claim 11, wherein the instructions, when executed by the at least one processor, cause the apparatus to:

output, via the user interface, an update pop-up dialog box, and update the software based on an update instruction signal that is received via the user interface and indicating the update.

20. The apparatus of claim 11, wherein the instructions, when executed by the at least one processor, cause the apparatus to:

based on the updating of the safety controller being complete, control the vehicle to change a state of the vehicle to a drivable state; and during autonomous driving of the vehicle in the drivable state, perform a background update of vehicle software that is not associated with the safety controller.

* * * * *